United States Patent
Watanabe (10) Patent No.: US 6,301,241 B1
(45) Date of Patent: Oct. 9, 2001

(54) TRANSMISSION RIGHT ASSIGNING METHOD AND COMMUNICATION SYSTEM

(75) Inventor: Takayuki Watanabe, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/160,582

(22) Filed: Sep. 25, 1998

(30) Foreign Application Priority Data

Oct. 2, 1997 (JP) .................................................. 9-270200

(51) Int. Cl.[7] ........................................................ H04J 3/16
(52) U.S. Cl. ........................ 370/346; 370/461; 370/462; 370/455
(58) Field of Search ............................ 370/346, 431, 370/437, 449, 450, 462, 455, 461

(56) References Cited

U.S. PATENT DOCUMENTS

| | | | |
|---|---|---|---|
| 4,803,681 | * | 2/1989 | Takahashi .......................... 370/447 |
| 4,839,892 | * | 6/1989 | Sasaki ................................ 370/348 |
| 5,636,223 | * | 6/1997 | Reardon et al. ................... 370/431 |

FOREIGN PATENT DOCUMENTS 5-95361    4/1993 (JP) .

* cited by examiner

Primary Examiner—Douglas Olms
Assistant Examiner—Inder Pal Mehra
(74) Attorney, Agent, or Firm—Oblon, Spivak, McClelland, Maier & Neustadt, P.C.

(57) ABSTRACT

A plurality of devices and a transmission right assigning device are connected to a transmission line. The transmission right assigning device transmits a transmission request retrieving frame, and then I/F in each device adds, if necessary, transmission request information including emergency degree information on transmission data in own device to a transmitted transmission request retrieving frame to transmit the added transmission request retrieving frame. I/F in the transmission right assigning device retrieves the transmission request retrieving frame added, if necessary, with transmission request information including emergency degree information on transmission data at each of the plurality of the devices. The transmission right assigning unit in the transmission right assigning device assigns the transmission right to one device out of the plurality of the devices, based on the transmission request information included in the retrieved transmission request retrieving frame.

10 Claims, 10 Drawing Sheets

| DEVICE | LEVEL 1 | | LEVEL 2 | | LEVEL 3 | | LEVEL 4 | |
|---|---|---|---|---|---|---|---|---|
| | NUMBER | LEVEL-NUMBER | NUMBER | LEVEL-NUMBER | NUMBER | LEVEL-NUMBER | NUMBER | LEVEL-NUMBER |
| 1-1 | 0 | ff | 0 | ff | 0 | ff | 0 | ff |
| 1-2 | 0 | ff | 1 | 1 | 0 | ff | 0 | ff |
| 1-3 | 0 | ff | 0 | ff | 0 | ff | 0 | ff |
| ......... | | | ......... | | ......... | | | |
| 1-6 | 1 | 0 | 0 | ff | 0 | ff | 0 | ff |
| ......... | | | ......... | | ......... | | | |
| 1-n | 0 | ff | 0 | ff | 0 | ff | 1 | 3 |

| DEVICE | LEVEL 1 | | LEVEL 2 | | LEVEL 3 | | LEVEL 4 | |
|---|---|---|---|---|---|---|---|---|
| | NUMBER | LEVEL-NUMBER | NUMBER | LEVEL-NUMBER | NUMBER | LEVEL-NUMBER | NUMBER | LEVEL-NUMBER |
| 1-1 | 0 | ff | 0 | ff | 0 | ff | 0 | ff |
| 1-2 | 0 | ff | 2 | 0 | 0 | ff | 0 | ff |
| 1-3 | 0 | ff | 0 | ff | 1 | 2 | 0 | ff |
| ...... | ...... | ...... | ...... | ...... | ...... | ...... | ...... | ...... |
| 1-6 | 0 | ff | 0 | ff | 0 | ff | 0 | ff |
| ...... | ...... | ...... | ...... | ...... | ...... | ...... | ...... | ...... |
| 1-n | 0 | ff | 0 | ff | 0 | ff | 2 | 2 |

| DEVICE | LEVEL 1 | | LEVEL 2 | | LEVEL 3 | | LEVEL 4 | |
|---|---|---|---|---|---|---|---|---|
| | NUMBER | LEVEL-NUMBER | NUMBER | LEVEL-NUMBER | NUMBER | LEVEL-NUMBER | NUMBER | LEVEL-NUMBER |
| 1-1 | 0 | ff | 0 | ff | 0 | ff | 0 | ff |
| 1-2 | 0 | ff | 0 | ff | 0 | ff | 0 | ff |
| 1-3 | 0 | ff | 0 | ff | 2 | 1 | 0 | ff |
| ...... | ...... | ...... | ...... | ...... | ...... | ...... | ...... | ...... |
| 1-6 | 0 | ff | 0 | ff | 1 | 2 | 0 | ff |
| ...... | ...... | ...... | ...... | ...... | ...... | ...... | ...... | ...... |
| 1-n | 0 | ff | 0 | ff | 0 | ff | 3 | 1 |

| DEVICE | LEVEL 1 | | LEVEL 2 | | LEVEL 3 | | LEVEL 4 | |
|---|---|---|---|---|---|---|---|---|
| | NUMBER | LEVEL-NUMBER | NUMBER | LEVEL-NUMBER | NUMBER | LEVEL-NUMBER | NUMBER | LEVEL-NUMBER |
| 1-1 | 0 | ff | 0 | ff | 0 | ff | 0 | ff |
| 1-2 | 0 | ff | 1 | 1 | 0 | ff | 0 | ff |
| 1-3 | 0 | ff | 0 | ff | 0 | ff | 0 | ff |
| ……… | | ……… | | ……… | | ……… | | ……… |
| 1-6 | 0 | ff | 0 | ff | 2 | 1 | 0 | ff |
| ……… | | ……… | | ……… | | ……… | | ……… |
| 1-n | 0 | ff | 0 | ff | 0 | ff | 4 | 0 |

| DEVICE PRIORITY 1 | REAR MONITOR SENSOR<br>FRONT MONITOR SENSOR<br>.<br>. |
|---|---|
| DEVICE PRIORITY 2 | TELEPHONE<br>TRAFFIC INFORMATION<br>.<br>. |
| DEVICE PRIORITY 3 | DVD<br>CD<br>.<br>. |

FIG.11

TRANSMISSION RIGHT ASSIGNING METHOD AND COMMUNICATION SYSTEM

BACKGROUND OF THE INVENTION

1. Field of the Invention

The present invention relates to a transmission right assigning method for assigning a transmission right to one device of a plurality of devices which are connected to a transmission line and a communication system in which the method is employed.

2. Prior Art

Heretofore, there has been known a network system as a Local Area Network (LAN) management system described in Japanese Patent application of Laid-open No. Hei 5-95361. The LAN management system is constructed by interconnecting a plurality of terminal units through a data transmission line for exchanging data between.

In the above conventional LAN management method, one master unit and a plurality of terminal units are connected by a ring-like data transmission line, and the master unit sends a polling frame to the terminal units one by one through the ring-like data transmission line.

Each terminal unit having no data for transmission sends back a response polling frame to the master unit, while each terminal unit having data for transmission sends back a message data frame to the master unit.

When the master unit receives a response polling frame from a certain terminal unit, the master unit sends a polling frame to the next terminal unit. On the other hand, when the master unit receives a message data frame from a certain terminal unit, the master unit sends a message data frame to the terminal unit and then sends a polling frame to the next terminal unit.

In the above conventional Local Area Network (LAN) management system, however, the master unit sends a polling frame to each terminal unit one by one through the ring-like data transmission line, therefore it takes relatively long time to receive response frame, with the result that it is difficult to transmit emergency data to a destination terminal unit quickly.

As the master unit assigns a transmission right to all terminal unit one after another, but some of them having no data for transmission, there is a certain amount of waist time for data transmission. In addition, as a communication between each terminal unit is carried out through the master unit, there is a disadvantage that data communication speed is relatively low.

SUMMARY OF THE INVENTION

In view of the above situation, it is an object of the present invention to provide a transmission right assigning method and a communication system which are capable of satisfying a request for transmitting emergency data immediately and improving a transmission efficiency on the system.

To attain the above object of the present invention, there is provided a transmission right assigning method for assigning a transmission right indicating right of exploitation of a communication line to one device out of a plurality of devices, which are connected to the communication line and communicate each other, by a transmission right assigning device which is one device of the plurality of the devices, the method comprising the steps of: transmitting, to the plurality of the devices, a transmission request retrieving frame for retrieving transmission requests from the plurality of the devices by the transmission right assigning device; adding, if necessary, transmission request information including emergency degree information on transmission data in own device to the transmitted transmission request retrieving frame, by the plurality of the devices; retrieving the transmission request retrieving frame added, if necessary, with transmission request information including emergency degree information on transmission data at each of the plurality of the devices, by the transmission right assigning device; and assigning the transmission right to one device out of the plurality of the devices, based on the transmission request information included in the retrieved transmission request retrieving frame, by the transmission right assigning device.

In a preferred embodiment of the present invention, the transmission right assigning device assigns the transmission right to one device out of the plurality of the devices, based on the emergency degree information on the transmission data and transmission request count information regarding the transmission data included in the transmission request information.

In a preferred embodiment of the present invention, the transmission right assigning device, every time retrieving the transmission request retrieving frame, performs a calculation between the emergency degree information on the transmission data and transmission request count information regarding the transmission data included in the transmission request information; generates calculation information indicating how high the emergency degree is and how many the transmission request count is; stores the calculation information into a transmission request information table; and assigns the transmission right to one device out of the plurality of the devices, based on the calculation information.

In a preferred embodiment of the present invention, when a device to be assigned the transmission right can not be determined because of the presence of a plurality of devices having the same value of the calculation information each other, the transmission right assigning device assigns the transmission right to a device having the highest emergency degree out of the plurality of the devices having the same value of the calculation information each other in accordance with emergency degree.

In a preferred embodiment of the present invention, when a device to be assigned the transmission right can not be determined because of the presence of a plurality of devices having the same value of the emergency degree each other, the transmission right assigning device assigns the transmission right to a device having the highest device priority out of the plurality of the devices having the same value of the emergency degree each other.

To attain the above object of the present invention, there is provided a communication system, comprising: a communication line; and a plurality of devices, each connected to the communication line, for communicating each other; one of the plurality of the devices being a transmission right assigning device which assigns a transmission right indicating right of exploitation of a communication line to one device out of the plurality of the devices, wherein the plurality of the devices comprises an information transmitting means for adding, if necessary, transmission request information including emergency degree information on transmission data in own device to a transmitted transmission request retrieving frame; and the transmission right assigning device comprises a transmitting/receiving means for transmitting a transmission request retrieving frame to the plurality of the devices and retrieving the transmission request retrieving frame added, if necessary, with transmission request information including emergency degree information on transmission data at each of the plurality of the devices; and a transmission right assigning means for assigning the transmission right to one device out of the plurality of the devices, based on the transmission request information included in the retrieved transmission request retrieving frame.

According to the present invention, the transmission right assigning device transmits the transmission request retrieving frame to each of the plurality of the devices and then the information transmitting means in each device adds, if necessary, transmission request information including emergency degree information on transmission data in own device to the transmitted transmission request retrieving frame to transmit the added transmission request retrieving frame. The transmitting/receiving means retrieves the transmission request retrieving frame added, if necessary, with transmission request information including emergency degree information on transmission data at each of the plurality of the devices. The transmission right assigning means for assigning the transmission right to one device out of the plurality of the devices, based on the transmission request information included in the retrieved transmission request retrieving frame. Therefore, since a device which has acquired the transmission right can immediately transmit data, the request for transmitting emergency can be satisfied. Further, since the presence information of the transmission data is employed, a device not having the data to be transmitted is never assigned a transmission right and thus the speed of the transmission can be improved. Furthermore, a collision of data flow on the transmission line can be avoided.

In a preferred embodiment of the present invention, the transmission right assigning means assigns the transmission right to one device out of the plurality of the devices, based on the emergency degree information on the transmission data and transmission request count information regarding the transmission data included in the transmission request information.

According to the embodiment, the transmission right assigning means assigns a transmission right to one device out of plural devices on the basis of the emergency degree of the transmission data and information on the number of the transmission requests regarding the transmission data included in the transmission request information. Therefore, although having low emergency, the transmission data having a relatively large number of the transmission requests can be transmitted as soon as possible without being left.

In a preferred embodiment of the present invention, the transmission right assigning device comprises a transmission request information table for storing the transmission request information included in the retrieved transmission request retrieving frame; and the transmission right assigning means, every time retrieving the transmission request retrieving frame, performs a calculation between the emergency degree information on the transmission data and transmission request count information regarding the transmission data included in the transmission request information; generates calculation information indicating how high the emergency degree is and how many the transmission request count is; stores the calculation information into the transmission request information table; and assigns the transmission right to one device out of the plurality of the devices, based on the calculation information.

According to the embodiment, the transmission right assigning means refers to information of calculation between the emergency information and the transmission request count information stored in the transmission request information and then assigns a transmission right to one device out of the plurality of the devices according to the calculation information. Therefore it is suitable for the emergency transmission and data with low emergency degree can be considered.

In a preferred embodiment of the present invention, when a device to be assigned the transmission right can not be determined because of the presence of a plurality of devices having the same value of the calculation information each other, the transmission right assigning means assigns the transmission right to a device having the highest emergency degree out of the plurality of the devices having the same value of the calculation information each other in accordance with emergency degree.

According to the embodiment, when a device to be assigned a transmission right can not be determined because of the presence of a plurality of devices having the same value of the calculation information each other, the transmission right assigning means assigns a transmission right to a device having the highest emergency degree out of the plurality of the devices having the same value of the calculation information each other in accordance with emergency degree. Therefore data with the highest emergency degree can be transmitted prior to any other data.

In a preferred embodiment of the present invention, when a device to be assigned the transmission right can not be determined because of the presence of a plurality of devices having the same value of the emergency degree each other, the transmission right assigning means assigns the transmission right to a device having the highest device priority out of the plurality of the devices having the same value of the emergency degree each other.

According to the embodiment, when a device to be assigned a transmission right can not be determined because of the presence of a plurality of devices having the same value of the emergency degree each other, the transmission right assigning means assigns a transmission right to a device having the highest device priority out of the plurality of the devices having the same value of the emergency degree each other. Therefore data with the highest device priority can be transmitted prior to any other dada.

The nature, principle and utility of the invention will become more apparent from the following detailed description when read in conjunction with the accompanying drawings.

DESCRIPTION OF THE PREFERRED EMBODIMENTS

A transmission right assigning method and a communication system based on preferred embodiments of the present invention will be described in detail hereinunder with reference to the accompanying drawings.

Figure 1:
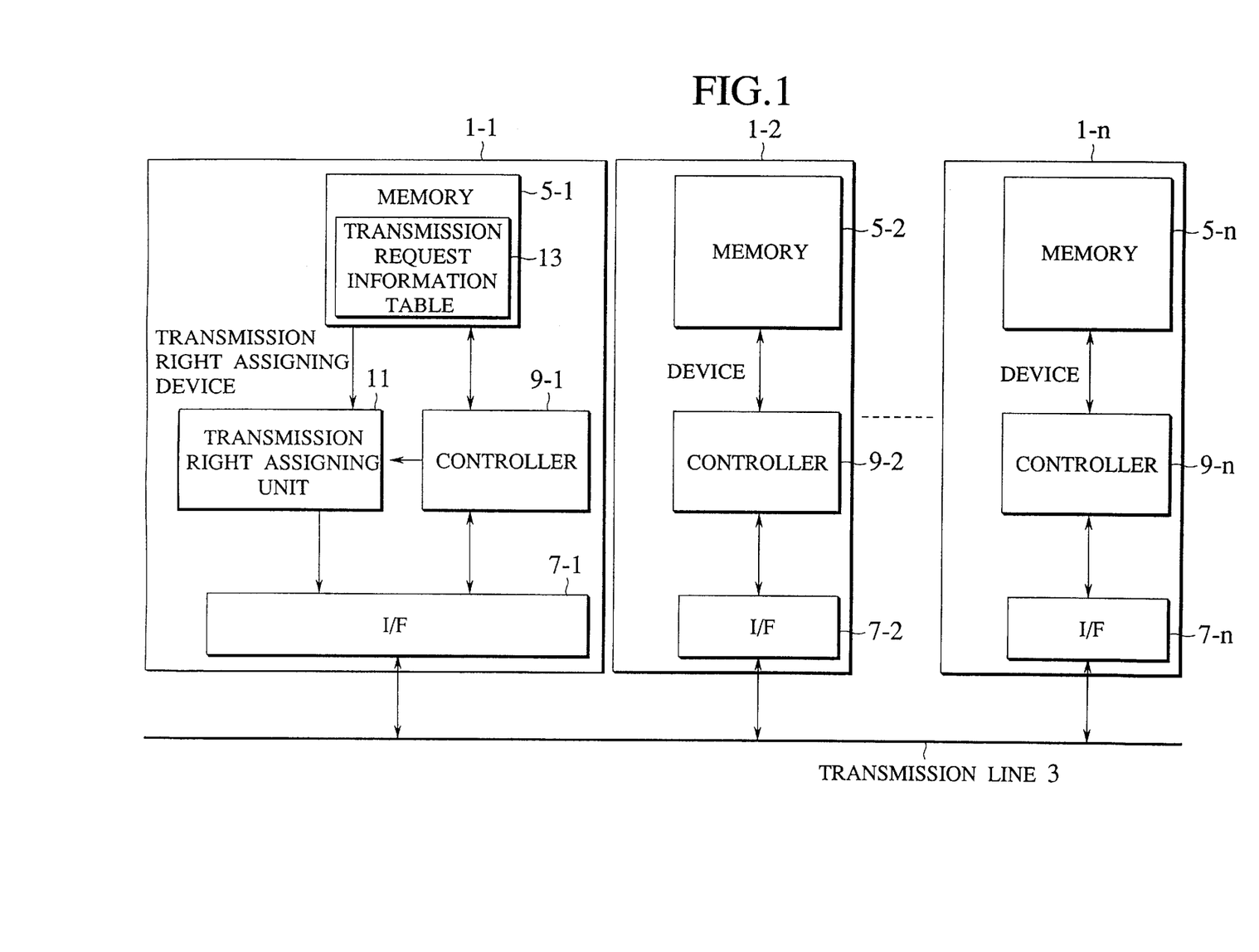
FIG. 1 is a schematic block diagram of a whole communication system according to an embodiment of the present invention.

In the communication system shown in FIG. 1, a plurality of functional devices 1-1 to 1-n are connected to a data communication line 3 so that data can be exchange therebetween.

The transmission right assigning device 1-1, which is a device generally supervising the synchronization control of the whole communication system and having the function of assigning a transmission right (right of exploitation of the communication line), comprises a memory 5-1 for storing data to be transmitted, an interface (to be abbreviated as I/F hereinafter) 7-1 for controlling data inputting from the communication line 3 and outputting to the communication line 3, a controller 9-1 for controlling the memory 5-1 and the I/F 7-1, and a transmission right assigning unit 11.

The memory 5-1 includes a transmission request information table 13 for storing a transmission request information. The transmission right assigning unit 11 assigns a transmission right to at least one of the functional devices 1-2 to 1-n with reference to the transmission request information stored in the transmission request information table 13. The functional device 1-2 as a typical example of the functional device comprises a memory 5-2, I/F 7-2 and controller 9-2. Each of the devices 1-3 to 1-n has the same configuration as the device 1-2.

The plurality of devices 1-1 to 1-n are devices such as a portable telephone, navigation system (NV), DVD (Digital Video Disc or Digital Versatile Disc) system, CD (Compact Disc) system, a sensor such as an azimuth sensor or car speed sensor, a monitor device, a audio speaker, etc.

The transmission right assigning device 1-1 transmits to the devices 1-2 to 1-n through transmission line 3 a transmission request retrieving frame for searching into whether the devices 1-2 to 1-n have data to be transmitted and, if any, the emergency degree of the data. The transmission request information table 13 is formed on the basis of the transmission request information carried in the transmission request retrieving frame transmitted from the devices 1-2 to 1-n to the transmission right assigning device 1-1.

Figure 2:
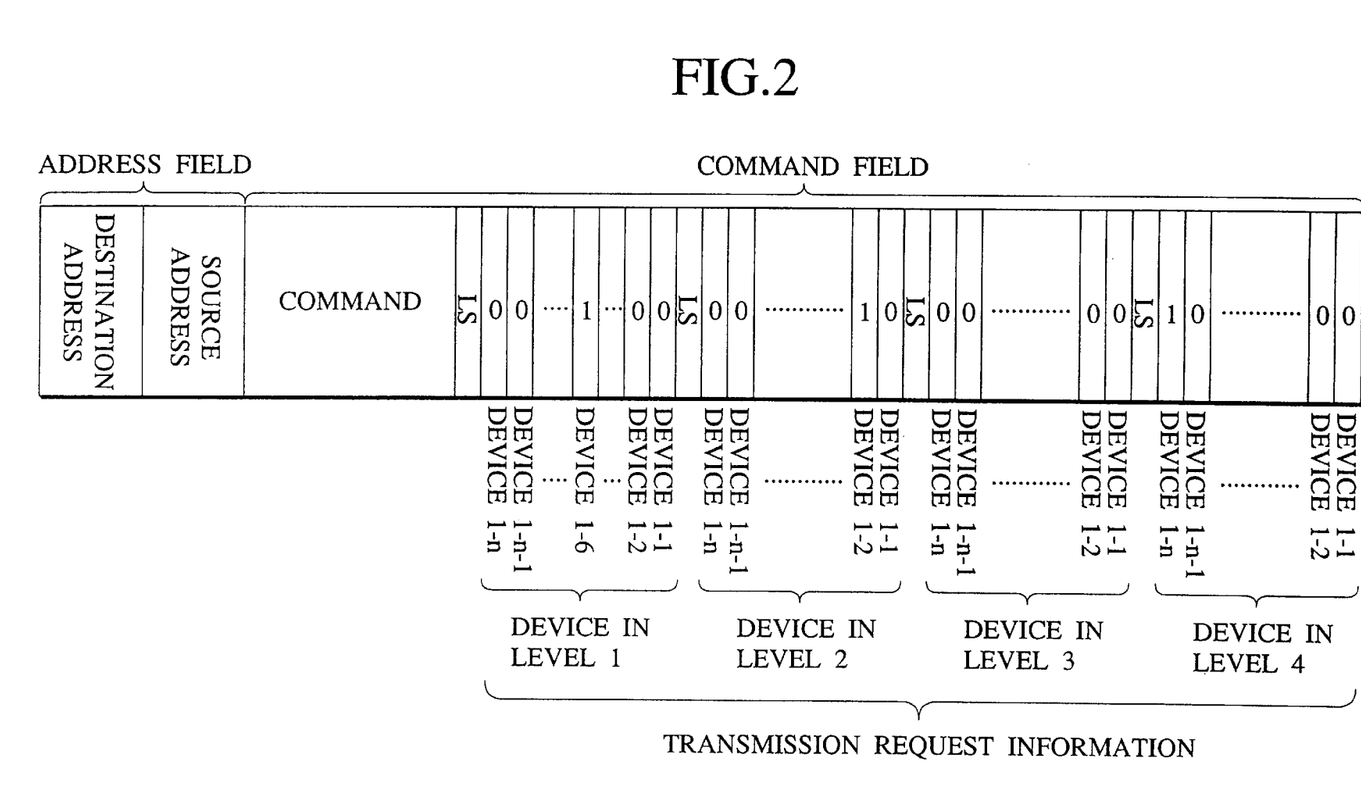
FIG. 2 is a diagram showing a first example of a transmission request retrieving frame transmitted by a transmission right assigning devise.

FIG. 2 shows a first example of the transmission request retrieving frame. The transmission request retrieving frame shown in FIG. 2 is composed of an address field and a command field.

A source address and a destination address are included in the address field. A command and transmission request information are included in the command field. The transmission request information is composed of information on existence of transmission data and level. The level indicates emergency degree of the transmission data and has four degrees for example.

The first level (level "1") request indicates emergency transmission, and thus a device which makes a transmission request of level "1" is assigned with a transmission right prior to all other devices. The second level (level "2") request indicates an urgent transmission, the third level (level "3") request indicates a normal transmission, and the fourth level (level "4") request indicates a routine transmission capable of waiting until the communication line 3 can be use.

At the head of an area for each level is provided a flag LS indicating the start point of each level. The transmission request information for each level is composed of flags of n bits corresponding to the number n of the plurality of devices 1-1 to 1-n. For example, the least significant flag shows the existence of transmission data in the transmission right assigning device 1-1, and the most significant flag shows the existence of transmission data in the device 1-n. When the flag is set to "1"(on), it means there is some data to be transmitted to the communication line 3 and when the flag is set to "0"(off), it means there is no data to be transmitted to the communication line 3.

In other words, each of the devices 1-2 to 1-n, having transmission data, sets own flag for each level to "1" to inform the transmission right assigning device 1-1 of the existence of the transmission data and the emergency degree of the data. As to the example shown in FIG. 2, with respect to devices in level "1", since the flag corresponding to the device 1-6 is set to "1", the device 1-6 has data to be transmitted in level "1".

Figure 3:
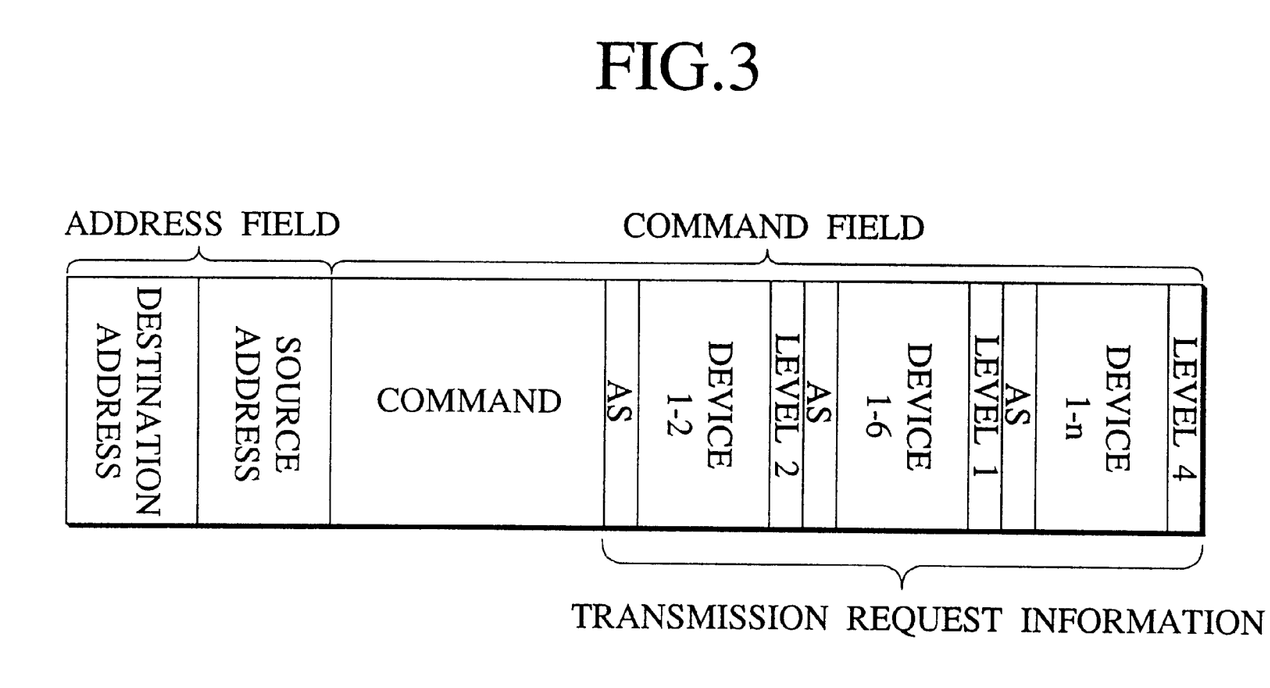
FIG. 3 is a diagram showing a second example of a transmission request retrieving frame transmitted by a transmission right assigning devise.

FIG. 3 shows a second example of the transmission request retrieving frame. The transmission request retrieving frame shown in FIG. 3 is different only with respect to the composition of the transmission request information from the first example of the transmission request retrieving frame shown in FIG. 2. The second example of the transmission request retrieving frame is formed such that own address and a level are provided for each device which has data to be transmitted. At the head of an area for each own address is provided a flag AS indicating the start point of the address. Upon making a transmission request, each of the devices 1-2 to 1-n adds own address and the level of the transmission data as transmission request information to a transmission request retrieving frame and then send the transmission request retrieving frame to a device having the next address.

Specifically, referring to the example shown in FIG. 3, the address of the device 1-2 and it's level number "2" are written in the top area of the transmission request information area, and the address of the 1-6 and it's level number "1" are written in the second area from left hand side of the transmission request information area, then the address of the functional device 1-n and it's level number "4" are written in the third area of the transmission request information area.

Figure 4:
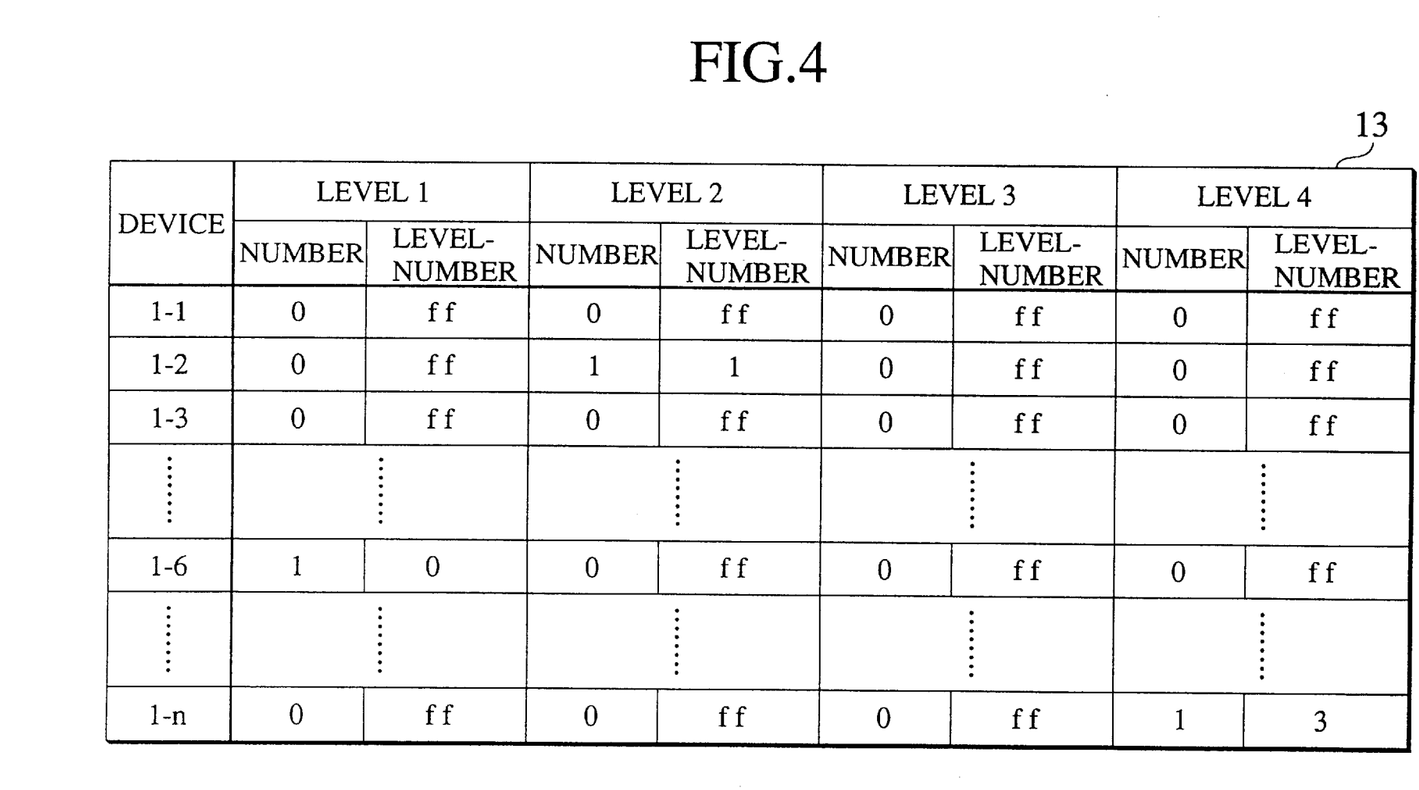
FIG. 4 is a diagram showing a first example of the transmission request information table used in the communication system.
Figure 5:
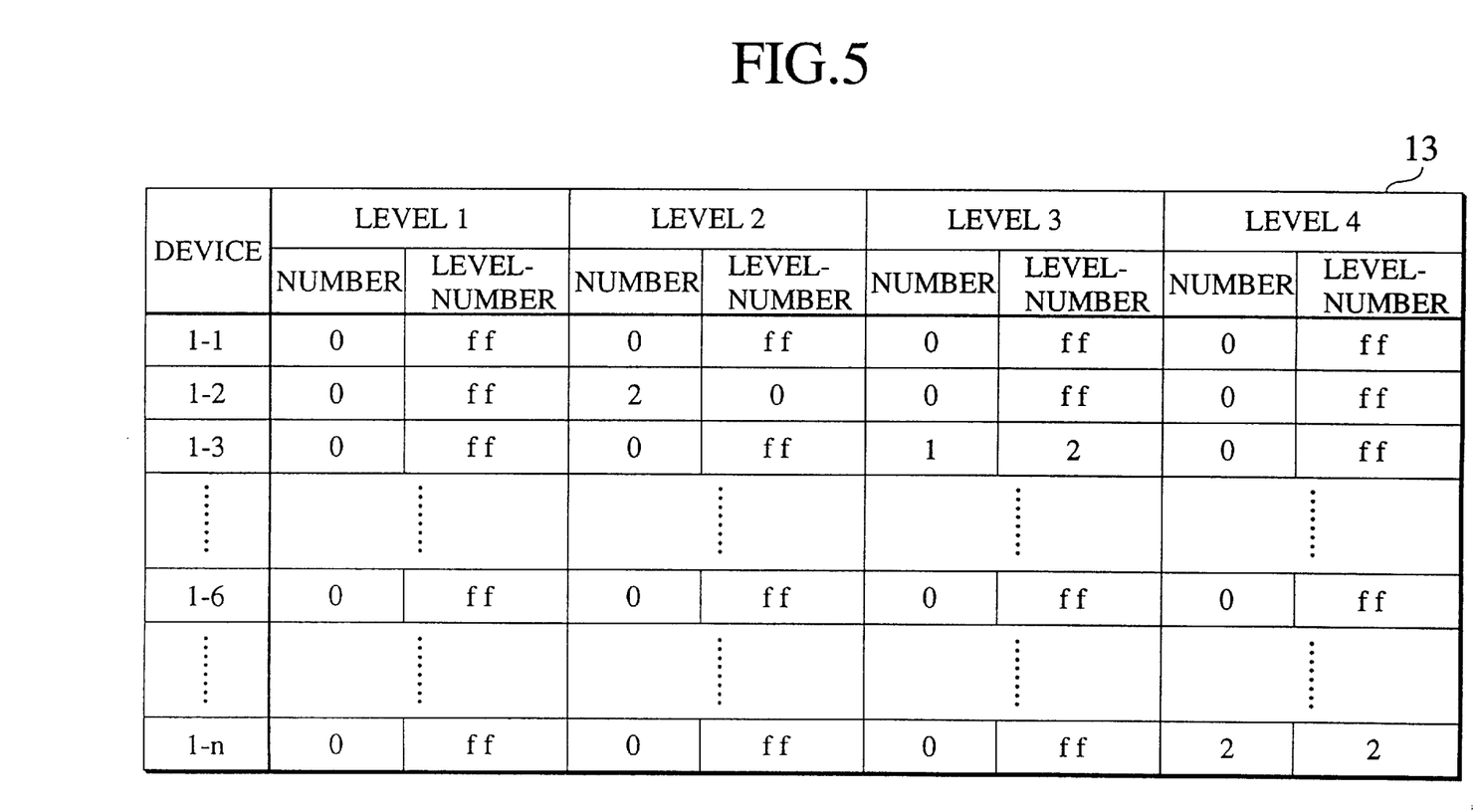
FIG. 5 is a diagram showing a second example of the transmission request information table used in the communication system.
Figure 6:
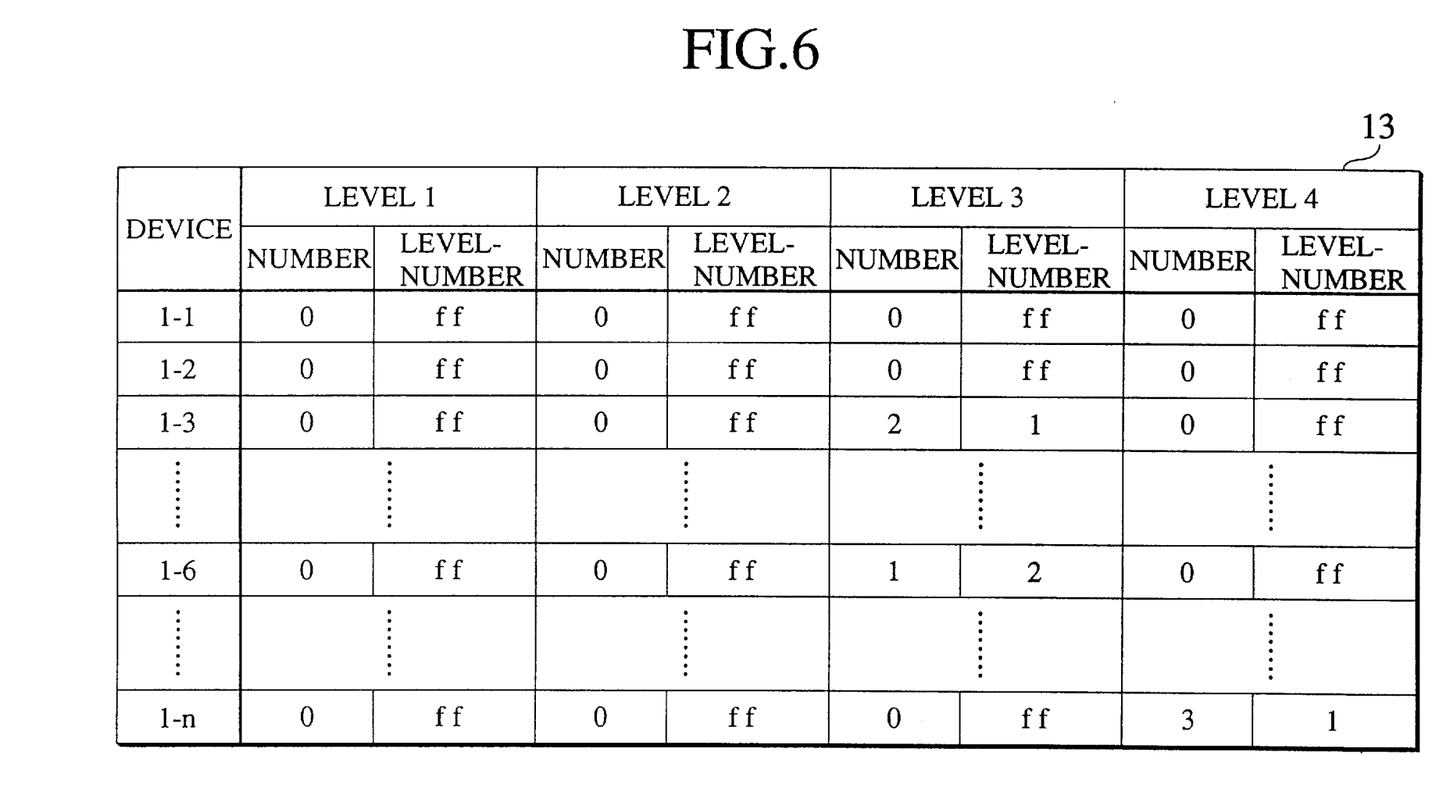
FIG. 6 is a diagram showing a third example of the transmission request information table used in the communication system.
Figure 7:
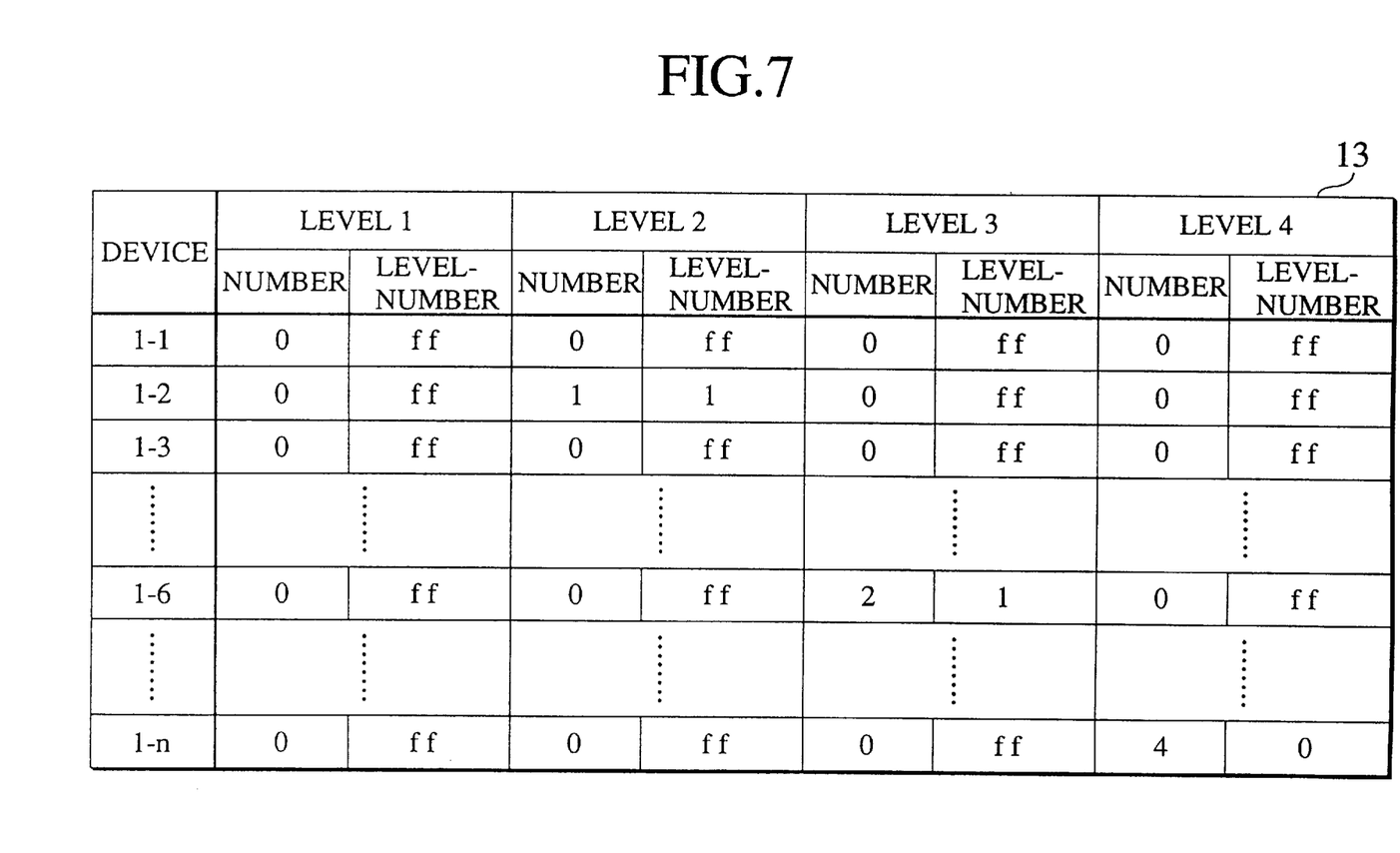
FIG. 7 is a diagram showing a fourth example of the transmission request information table used in the communication system.

Now, the first example of the transmission request information table 13 having the transmission request information is shown in FIG. 4, the second example of the transmission request information table 13 having the different transmission request information is shown in FIG. 5, the third example of the transmission request information table 13 having the further different transmission request information is shown in FIG. 6, and the fourth example of the transmission request information table 13 having the more further different transmission request information is shown in FIG. 7.

FIGS. 4–7 show the transition of the transmission request information table 13 every time the transmission right assigning device 1-1 receives the transmission request retrieving frame.

The first example of the transmission request information table 13 shown in FIG. 4 stores and retains contents of the first example of the transmission request retrieving frame shown in FIG. 2 or the second example of the transmission request retrieving frame shown in FIG. 3. The transmission request information table 13 stores and retains the number of the requests for transmission, and a value "level–number" which is obtained by subtracting the number of transmission requests from a level value.

In FIG. 4, as to elements having the number "0", "level–number" is "ff" indicating no value thereby being excluded. The device 1-n has level "4" and the number "1". Accordingly "level–number" thereof is "3".

FIG. 4 shows the example in which the devices 1-2, 1-6 and 1-n make transmission requests of levels "2", "1" and "4", respectively. In this case, the transmission right assigning unit 11 recognizes the transmission request of level "1" to assign the transmission right to the device 1-6 having level "1". After detecting the end of the transmission of the functional device 1-6, the transmission right assigning device 1-1 transmits the next transmission request retrieving frame to the communication line "3".

In the second example of the transmission request information table 13 shown in FIG. 5, next phase contents of the transmission request information table 13 after the phase shown in FIG. 4 are shown. In this phase, the devices 1-2 and 1-n continue to make transmission requests of levels "2" and "4", respectively, and the device 1-3 makes a transmission request of level "3". Accordingly since both of the numbers of the transmission requests of the device 1-2 and 1-n are "2", "level–number"s of the devices 1-2 and 1-n are "0" and "2", respectively. The transmission right assigning unit 11 in the transmission right assigning device 1-1 refers to the transmission request information table 13 to assign the transmission right to the device 1-2 having "level–number" of minimum value.

In the third example of the transmission request information table 13 shown in FIG. 6, next phase contents of the transmission request information table 13 after the phase shown in FIG. 5 are shown. In this phase, the devices 1-3 and 1-n continue to make transmission requests of levels "3" and "4", respectively, and the device 1-6 makes a transmission request of level "3". Accordingly the device 1-3 has the number of "2" and thus the "level–number" thereof is "1". The device 1-n has the number of "3" and thus the "level–number" thereof is "1". Therefore the "level–number"s of the device 1-3 and 1-n are the same each other. In this situation, the transmission right assigning unit 11 judges from the level itself. Specifically, since the level of the device 1-3 is higher than the level of the device 1-n with respect to the emergency degree, the transmission right assigning unit 11 in the transmission right assigning device refers to the transmission request information table 13 to assign the transmission right to the device 1-3.

In the fourth example of the transmission request information table 13 shown in FIG. 7, next phase contents of the transmission request information table 13 after the phase shown in FIG. 6 are shown. In this phase, the devices 1-6 and 1-n continue to make transmission requests of levels "3" and "4", respectively, and the device 1-2 makes a transmission request of level "2". Accordingly the device 1-n has the number of "4" and thus the "level–number" thereof is "0". The transmission right assigning unit 11 in the transmission right assigning device refers to the transmission request information table 13 to assign the transmission right to the device 1-n having "level–number" of minimum value. This example shows that the device 1-n having a large number of transmission request can obtain a transmission right even though the transmission request has low level.

Figure 8:
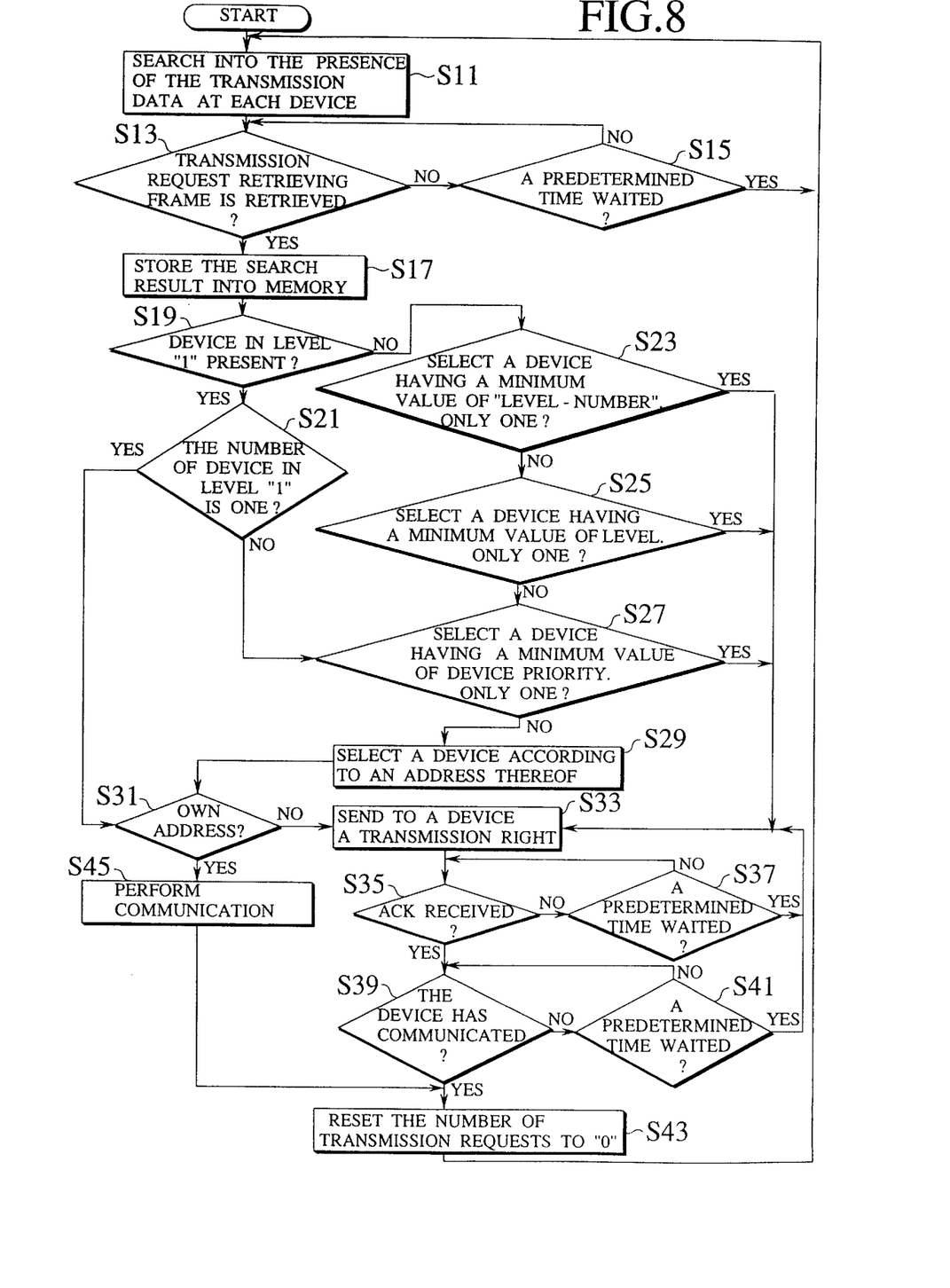
FIG. 8 is a flow chart showing the processing procedure in a transmission right assigning device.

The operation of, the transmission right assigning device 1-1 will be described hereinunder in conjunction with the operation flow chart in FIG. 8.

The transmission right assigning device 1-1 searches into whether any of the devices 1-2 to 1-n has data to be transmitted or not and the emergency degree of the data if any(step S11). In this case, I/F 7-1 in the transmission right assigning device 1-1 transmits a transmission request retrieving frame to the devices 1-2 to 1-n through the transmission line 3 for searching into whether any device has data to be transmitted and the emergency degree of the data if any.

On the other hand, upon receiving the transmission request retrieving frame, each of the devices 1-2 to 1-n, if having data to be transmitted, sets own flag for each level as shown in FIGS. 2 and 3 to inform the transmission right assigning device 1-1 of the presence of the transmission data and the emergency degree thereof.

If the transmission request retrieving frame shown in FIG. 2 is employed, each of the devices 1-2 to 1-n need to know own allocated flag location in the transmission request retrieving frame. Therefore after addressing the transmission right assigning device 1-1 transmits a transmission request retrieving frame for informing each of the devices 1-2 to 1-n of the allocated flag location. Each of the devices 1-2 to 1-n receives information of allocation of the flag location to be used and then shifts the flag location to be used in the transmission request retrieving frame to transmit the same to the next device.

Figure 9A:
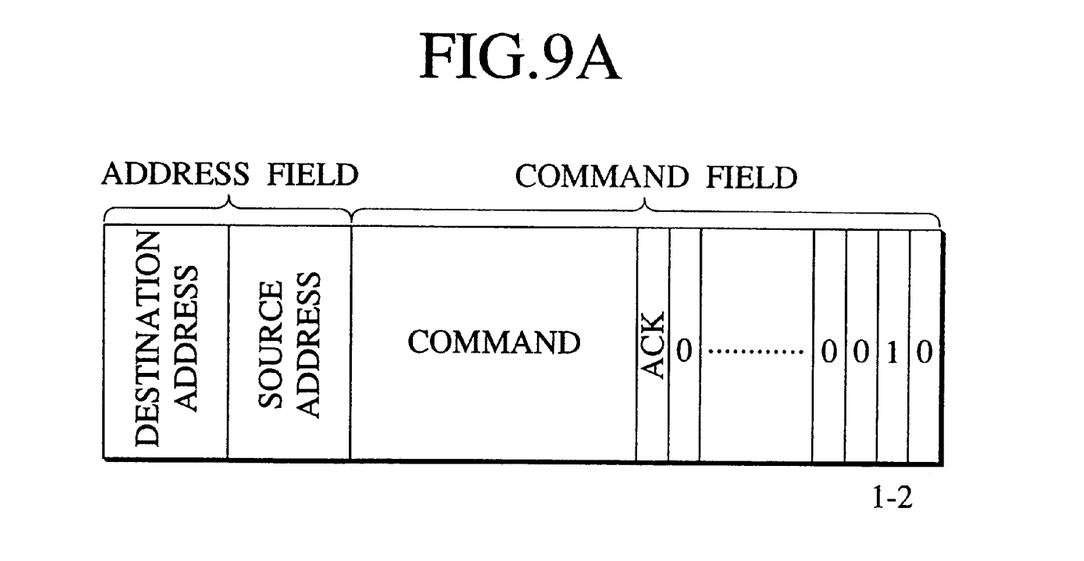
FIGS. 9A and 9B are diagrams showing examples of transmission request retrieving frame for allocating a flag position to each device.
Figure 9B:
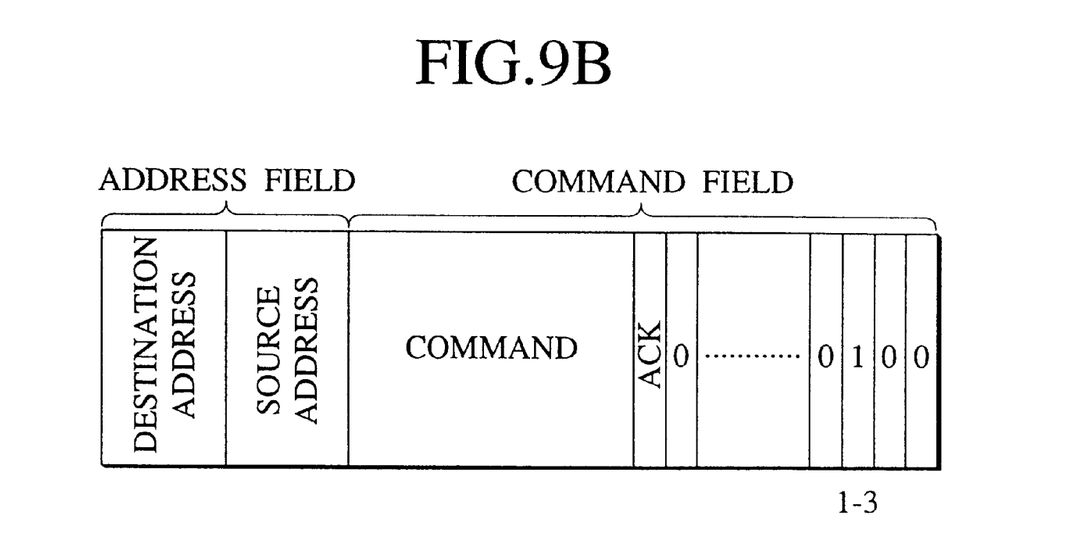

FIG. 9A shows a transmission request retrieving frame to be received by the device 1-2. The flag location corresponding to the device 1-2 has a value "1" in the transmission request retrieving frame. The device 1-2 recognizes the flag location having the value "1" as own allocated flag location. Then the device 1-2 shifts the flag "1" to the left by one to transmit the transmission request retrieving frame shown in FIG. 9B to the next device 1-3. Thus the allocation of flag location is received by the devices 1-1, 1-2, 1-3, 1-4, . . . , 1-n sequentially. As a modified embodiment, each of the devices may shift a received flag to recognize the flag location after the shift as own allocated flag location.

As described above, each of the devices 1-2 to 1-n recognizes own flag location and the device having data to be transmitted sets own flag for each level to inform the transmission right assigning device 1-1 of a transmission request retrieving frame including the presence of the transmission data and the emergency degree thereof.

The transmission request retrieving frame shown in FIG. 2 for example is generated by the following steps.

First, the transmission request assigning device 1-1 sends a transmission request retrieving frame to the device 1-2 and at that time the device 1-2 has data to be transmitted. Therefore the device 1-2 sets a flag "1" to a flag location corresponding to the device 1-2 in the field of level "2" in the transmission request information field in the transmission request retrieving frame shown in FIG. 2 and leaves own flag locations in other level fields to be "0" to transmit the transmission request retrieving frame to the device 1-3. The device 1-3 which has no data to be transmitted transmits the transmission request retrieving frame as it is to the device 1-6 through the devices 1-4 and 1-5.

The device 1-6 which has data to be transmitted sets a flag "1" to a flag location corresponding to the device 1-6 in the field of level "1" in the transmission request information field in the transmission request retrieving frame shown in FIG. 2 and leaves own flag locations in other level fields to be "0" to transmit the transmission request retrieving frame to the device 1-7. The transmission request retrieving frame is transmitted as it is to the devices 1-8, . . . , 1-n.

The device 1-n which has data to be transmitted sets a flag "1" to a flag location corresponding to the device 1-n in the field of level "4" in the transmission request information field in the transmission request retrieving frame shown in FIG. 2 and leaves own flag locations in other level fields to be "0" to transmit the transmission request retrieving frame to the transmission right assigning device 1-1.

The I/F 7-1 judges whether the transmission right assigning device 1-1 has received the transmission request retrieving frame or not (step 13). When the transmission right assigning device 1-1 has not yet received the transmission request retrieving frame, the I/F 7-1 judges whether the transmission right assigning device 1-1 has waited for a predetermined period of time or not (step 15). When the transmission right assigning device 1-1 has waited for a predetermined period, the process goes back to step S11, while when not, the process goes back to step S13.

When the transmission right assigning device 1-1 has received the transmission request retrieving frame, the controller 9-1 stores examination result such as transmission request information added to the retrieved transmission request retrieving frame into the transmission request information table 13 in memory 5-1 (step S17). The transmission right assigning unit 11 refers to the transmission request information table 13 to judge whether there is any device having level "1" (step S19).

When there is any device having level "1" in the transmission request information table 13, the transmission right assigning unit 11 judges whether the number of the device(s) having level "1" is only one or more (step S21). When there are a plurality of devices having level "1", the process goes to step S27, while when there is only one device having level "1", the process goes to step S31. Specifically, as to the example of the transmission request information table 13 shown in FIG. 4, only the device 1-6 has level "1".

At step S19, when there is no device having level "1" in the transmission request information table 13, the transmission right assigning unit 11 selects the device(s) having "level-number" of minimum value to judge whether the number of the selected device(s) is only one or more (step S23). As to the example of the transmission request information table 13 shown in FIG. 5, the device 1-2 has "level-number" of minimum value. As to the example of the transmission request information table 13 shown in FIG. 7, the device 1-n has "level-number" of minimum value.

When there are a plurality of the selected devices, the transmission right assigning unit 11 selects the device(s) having level of minimum value and then judges whether the number of the selected device(s) is only one or more (step S25). As to the example of the transmission request information table 13 shown in FIG. 6, the device 1-3 and the device 1-n have "level-number" of the same value each other, but the device has level of lower value, accordingly the device 1-3 is selected.

Figure 10:
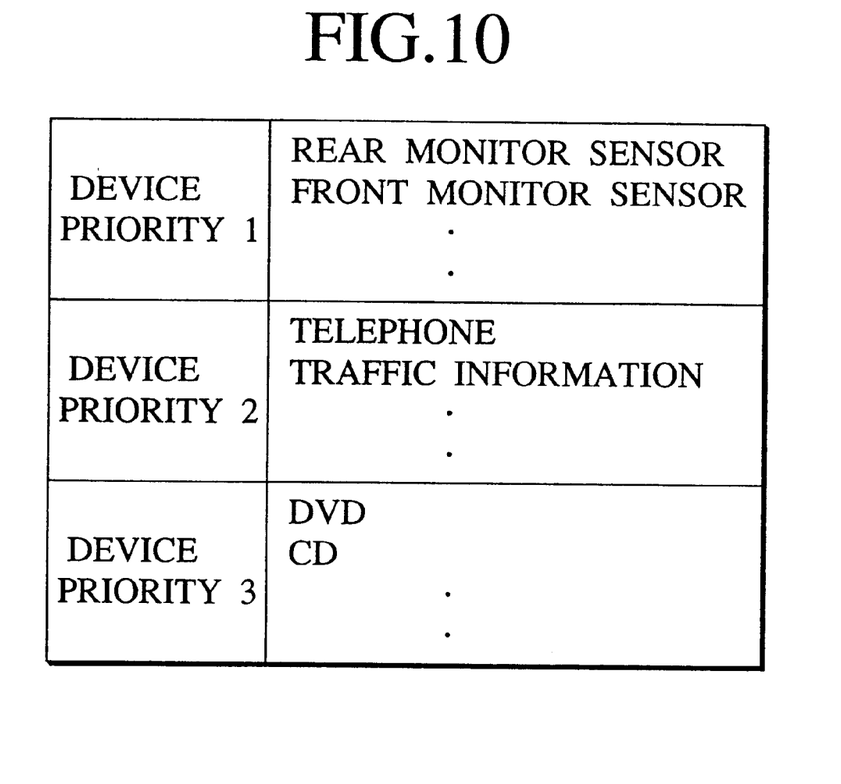
FIG. 10 is a diagram showing a example of device priorities in an on-board network system.

When there are a plurality of the selected devices, the transmission right assigning unit 11 selects the device(s) having device priority of maximum value and then judges whether the number of the selected device(s) is only one or more (step S27). FIG. 10 shows an example of device priority regarding an on-board network system. The on-board network system is a network system mounted on a vehicle. In the network system, a front monitor device, a rear monitor device, a portable telephone, a traffic information system, DVD (Digital Video Disc or Digital Versatile Disc) system, and CD (Compact Disc) system are connected to a communication line.

In this example, front and rear monitor devices, etc. have device priority "1", a portable telephone and a traffic information system, etc. have device priority "2", and DVD system and CD system have device priority "3". Therefore a front monitor device and a rear monitor device with device priority "1" are selected by the transmission management unit 11 at step 27. When there are a plurality of the selected devices, the transmission right assigning unit 11 selects a device according to device address value (step S29). In this case, the transmission management unit 11 selects a device having smaller address value out of the selected front and rear monitor devices.

Then the transmission right assigning device 1-1 judges whether an address of the selected device is own address or not (step S31). When the address of the selected device is not own address, the transmission right assigning device 1-1 assigns a transmission right to the selected device (step S33).

The process goes to step S33 in either case of the case where the device(s) having "level-number" of minimum value is(are) selected and then the number of the selected device(s) is one at step S23; the case where the device(s) having level of minimum value is(are) selected and then the number of the selected device(s) is one at step S25; and the case where the device(s) having device priority of minimum value is(are) selected and then the number of the selected device(s) is one at step S27. At step S33, the transmission right assigning device 1-1 assigns a transmission right to the selected device.

Figure 11:
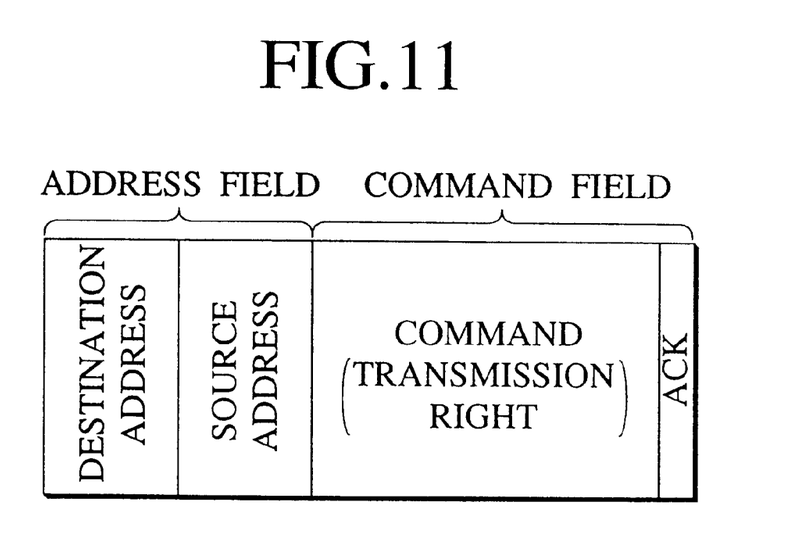
FIG. 11 is a diagram showing a example of a transmission permitting frame for assigning a transmission right to a selected device.

The transmission right assigning device 1-1 sends a transmission permitting frame for example shown in FIG. 11 to the selected device. The transmission permitting frame includes a destination address area, a source address area and a command area designating transmission right. In this case, an address of the selected device is written in the destination address area, and an address of the transmission right assigning device 1-1 is written in the source address area.

Upon receiving the transmission permitting frame from the transmission right assigning device 1-1, the selected device acquires a transmission right and then adds "ACK" designating safety receipt of the transmission permitting frame to the last area in the transmission permitting frame to send it back to the transmission right assigning device 1-1.

The transmission right assigning device 1-1 judges whether or not the transmission permitting frame added by "ACK" has come back from the device which has acquired the transmission right (step S35). When the transmission permitting frame added by "ACK" has not come back, the I/F 7-1 in the transmission right assigning device 1-1 judges whether the transmission right assigning device 1-1 has waited for a predetermined period of time or not (step S37).

When the transmission right assigning device 1-1 has waited for a predetermined period of time, the process goes back to step S33, while when not, the process goes back to step S35.

When the transmission permitting frame added by "ACK" has not come back, the transmission right assigning device 1-1 judges whether or not the device which has acquired the transmission right has performed a transmission (step S39). When the device which has acquired the transmission right has not performed a transmission, the I/F 7-1 in the transmission right assigning device 1-1 judges whether the transmission right assigning device 1-1 has waited for a predetermined period of time or not (step S41). When the transmission right assigning device 1-1 has waited for a predetermined period of time, the process goes back to step S33, while when not, the process goes back to step S39.

When the device which has acquired the transmission right has performed a transmission, the transmission right assigning unit 11 resets the number of transmission requests with respect to the device which has performed the transmission to "0" (step S43), the process goes to step S11. At step S31, when the address of the selected device is own address, the transmission right assigning device 1-1 performs a transmission (step S45), the process goes to step S43.

As described above, in the communication system where the plurality of the devices are connected each other, the transmission right assigning device 1-1 searches into the presence of data to be transmitted at the functional device 1-2 to 1-n and the emergency degree of the data to prepare the transmission request information table 13. The transmission right assigning device 1-1 selects one device to be assigned a transmission right among the devices 1-2 to 1-n, based on transmission request information included in the transmission request information table 13, specifically based on the presence of data to be transmitted at each device, the number of the transmission requests at each device, and the emergency degree of the data. Therefore, this invention can satisfy a request for transmitting emergency. Further, although having low emergency, the transmission data having a relatively large number of the transmission requests can be transmitted as soon as possible without being left. Furthermore, since the presence information of the transmission data is employed, a device not having the data to be transmitted is never assigned a transmission right and thus the speed of the transmission can be improved.

The transmission right assigning device 1-1 transmits a transmission request retrieving frame to search into the presence of transmission data at each device every time after the device having the transmission right has performed a transmission. Therefore a device which is most suitable to transmit data is always selected. In other words, only one device has a transmission right and whereby a collision of data flow on the transmission line 3 can be avoided.

It should be noted that the communication system according to the present invention is not limited to the bus-type communication system shown in FIG. 1 and a ring-type communication system in which a plurality of the devices 1-1 to 1-n are connected to the ring-type communication line 3 may be employed. Further, in the embodiments, two examples are specified as the transmission request retrieving frame for searching into a transmission right, but the scope of this invention is not limited to this.

In the above embodiments, though four levels of the transmission data are employed, the number of levels is not limited to four and thus any other number of levels may be employed. Further, in the above embodiments, a device which should be assigned a transmission right is determined on the basis of the calculation result of "level−number", the scope of this invention is not limited to this. For example, assuming that, the larger the level number is, the higher the emergency degree is, then the transmission right should be assigned to a device having the largest calculation result of "level+number".

The order of flag and level for each device, and the order of device address and level are not limited to those shown in FIGS. 2 and 3, any other forms may be employed.

According to the this embodiment of the present invention as described above, the transmission right assigning device sends a transmission request retrieving frame to each of devices. Each device adds transmission request information including the emergency degree of the transmission data in own device to the transmitted transmission request retrieving frame to send it. The transmission right assigning device retrieves the transmission request retrieving frame added if necessary with the transmission request information including the emergency degree of the transmission data for each of the plurality of the devices. The transmission right assigning unit in the transmission right assigning device assigns a transmission right to one device of the plurality of the devices on the basis of the transmission request information included in the retrieved transmission request retrieving frame. Accordingly, since a device which has acquired the transmission right can immediately transmit data, the request for transmitting emergency can be satisfied. Further, since the presence information of the transmission data is employed, a device not having the data to be transmitted is never assigned a transmission right and thus the speed of the transmission can be improved. Furthermore, a collision of data flow on the transmission line 3 can be avoided.

The transmission right assigning unit assigns a transmission right to one device out of plural devices on the basis of the emergency degree of the transmission data and information on the number of the transmission requests regarding the transmission data included in the transmission request information. Therefore, although having low emergency, the transmission data having a relatively large number of the transmission requests can be transmitted as soon as possible without being left.

The transmission right assigning unit refers to information of calculation between the emergency information and the transmission request count information stored in the transmission request information and then assigns a transmission right to one device out of the plurality of the devices according to the calculation information. Therefore it is suitable for the emergency transmission and data with low emergency degree can be considered.

When a device to be assigned a transmission right can not be determined because of the presence of a plurality of devices having the same value of the calculation information each other, the transmission right assigning unit assigns a transmission right to a device having the highest emergency degree out of the plurality of the devices having the same value of the calculation information each other in accordance with emergency degree. Therefore data with the highest emergency degree can be transmitted prior to any other data.

When a device to be assigned a transmission right can not be determined because of the presence of a plurality of devices having the same value of the emergency degree each other, the transmission right assigning unit assigns a transmission right to a device having the highest device priority out of the plurality of the devices having the same value of the emergency degree each other. Therefore data with the highest device priority can be transmitted prior to any other dada.

It should be understood that many modifications and adaptations of the invention will become apparent to those skilled in the art and it is intended to encompass such obvious modifications and changes in the scope of the claims appended hereto.

What is claimed is:

1. A transmission right assigning method for assigning a transmission right indicating right of exploitation of a communication line to one device out of a plurality of devices, which are connected to the communication line and communicate each other, by a transmission right assigning device which is one device of the plurality of the devices, the method comprising the steps of:

transmitting, to the plurality of the devices, a transmission request retrieving frame for retrieving transmission requests from the plurality of the devices by the transmission right assigning device;

adding, if necessary, transmission request information including emergency degree information on transmission data in own device to the transmitted transmission request retrieving frame, by the plurality of the devices:

retrieving the transmission request retrieving frame added, if necessary, with transmission request information including emergency degree information on transmission data at each of the plurality of the devices, by the transmission right assigning device; and assigning the transmission right to one device out of the plurality of the devices, based on the transmission request information included in the retrieved transmission request retrieving frame, by the transmission right assigning device.

2. A transmission right assigning method according to claim 1, wherein the transmission right assigning device assigns the transmission right to one device out of the plurality of the devices, based on the emergency degree information on the transmission data and transmission request count information regarding the transmission data included in the transmission request information.

3. A transmission right assigning method according to claim 2, wherein the transmission right assigning device, every time retrieving the transmission request retrieving frame, performs a calculation between the emergency degree information on the transmission data and transmission request count information regarding the transmission data included in the transmission request information; generates calculation information indicating how high the emergency degree is and how many the transmission request count is; stores the calculation information into a transmission request information table; and assigns the transmission right to one device out of the plurality of the devices, based on the calculation information.

4. A transmission right assigning method according to claim 3, wherein when a device to be assigned the transmission right can not be determined because of the presence of a plurality of devices having the same value of the calculation information each other, the transmission right assigning device assigns the transmission right to a device having the highest emergency degree out of the plurality of the devices having the same value of the calculation information each other in accordance with emergency degree.

5. A transmission right assigning method according to claim 4, wherein when a device to be assigned the transmission right can not be determined because of the presence of a plurality of devices having the same value of the emergency degree each other, the transmission right assigning device assigns the transmission right to a device having the highest device priority out of the plurality of the devices having the same value of the emergency degree each other.

6. A communication system, comprising:
a communication line; and
a plurality of devices, each connected to the communication line, for communicating each other;
one of the plurality of the devices being a transmission right assigning device which assigns a transmission right indicating right of exploitation of a communication line to one device out of the plurality of the devices, wherein the plurality of the devices comprises
an information transmitting means for adding, if necessary, transmission request information including emergency degree information on transmission data in own device to a transmitted transmission request retrieving frame to transmit the added transmission request retrieving frame; and the transmission right assigning device comprises
a transmitting/receiving means for transmitting a transmission request retrieving frame to the plurality of the devices and retrieving the transmission request retrieving frame added, if necessary, with transmission request information including emergency degree information on transmission data at each of the plurality of the devices; and a transmission right assigning means for assigning the transmission right to one device out of the plurality of the devices, based on the transmission request information included in the retrieved transmission request retrieving frame.

7. A communication system according to claim 6, wherein the transmission right assigning means assigns the transmission right to one device out of the plurality of the devices, based on the emergency degree information on the transmission data and transmission request count information regarding the transmission data included in the transmission request information.

8. A communication system according to claim 7, wherein the transmission right assigning device comprises a transmission request information table for storing the transmission request information included in the retrieved transmission request retrieving frame; and the transmission right assigning means, every time retrieving the transmission request retrieving frame, performs a calculation between the emergency degree information on the transmission data and transmission request count information regarding the transmission data included in the transmission request information; generates calculation information indicating how high the emergency degree is and how many the transmission request count is; stores the calculation information into the transmission request information table; and assigns the transmission right to one device out of the plurality of the devices, based on the calculation information.

9. A communication system according to claim 8, wherein when a device to be assigned the transmission right can not be determined because of the presence of a plurality of devices having the same value of the calculation information each other, the transmission right assigning means assigns the transmission right to a device having the highest emergency degree out of the plurality of the devices having the same value of the calculation information each other in accordance with emergency degree.

10. A communication system according to claim 8, wherein when a device to be assigned the transmission right can not be determined because of the presence of a plurality of devices having the same value of the emergency degree each other, the transmission right assigning means assigns the transmission right to a device having the highest device priority out of the plurality of the devices having the same value of the emergency degree each other.

* * * * *

UNITED STATES PATENT AND TRADEMARK OFFICE
CERTIFICATE OF CORRECTION

PATENT NO. : 6,301,241 B1
DATED : October 9, 2001
INVENTOR(S) : Takayuki Watanabe It is certified that error appears in the above-identified patent and that said Letters Patent is hereby corrected as shown below:

Column 4,
Line 44, change "dada" to -- data --.

Column 5,
Line 27, change "exchange" to -- exchanged --.

Column 6,
Line 16, change "use" to -- used --;
Line 54, "it's" to -- its --;
Line 57, "it's" to -- its --;
Line 59, "it's" to -- its --;

Column 7,
Line 41, change ""level-number"s" to -- "level-numbers" --;
Line 56, change ""level-number"s" to -- "level-numbers" --;

Column 8,
Line 11, change "request" to -- requests --.
Line 13, after of delete ",".

Column 12,
Line 64, change "dada" to -- data --.

Signed and Sealed this

Nineteenth Day of March, 2002

Attest:

JAMES E. ROGAN
*Director of the United States Patent and Trademark Office*

*Attesting Officer*